(12) United States Patent
Harrison et al.

(10) Patent No.: US 6,330,560 B1
(45) Date of Patent: Dec. 11, 2001

(54) MULTIPLE MANAGER TO MULTIPLE SERVER IP LOCKING MECHANISM IN A DIRECTORY-ENABLED NETWORK

(75) Inventors: Bret Elliott Harrison, Clayton; William Donald Reed, Wake Forest; Leo Temoshenko, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/394,113

(22) Filed: Sep. 10, 1999

(51) Int. Cl.[7] ..................................................... G06F 17/30
(52) U.S. Cl. ................................ 707/8; 707/10; 707/103; 707/201; 709/219; 709/226; 711/48; 711/114
(58) Field of Search ................................. 707/1–4, 8–10, 707/201–203, 103; 709/219, 224, 226, 228, 232; 711/4, 9, 48, 113, 114

(56) References Cited

U.S. PATENT DOCUMENTS

| | | | |
|---|---|---|---|
| 5,202,971 | 4/1993 | Henson et al. | 707/8 |
| 5,339,430 | 8/1994 | Lundin et al. | 709/332 |
| 5,454,108 | 9/1995 | Devarakonda et al. | 709/104 |
| 5,566,297 | * 10/1996 | Devarakonda et al. | 714/15 |
| 5,734,898 | 3/1998 | He | 707/203 |
| 5,737,536 | * 4/1998 | Herrmann et al. | 709/229 |
| 5,742,813 | 4/1998 | Kavanagh et al. | 707/8 |
| 5,812,857 | 9/1998 | Nelson et al. | 717/11 |
| 5,826,253 | 10/1998 | Bredenberg | 707/2 |
| 5,862,346 | 1/1999 | Kley et al. | 709/245 |
| 5,914,953 | * 6/1999 | Krause et al. | 370/392 |
| 5,936,962 | * 8/1999 | Haddock et al. | 370/446 |
| 5,956,712 | * 9/1999 | Bennett et al. | 707/8 |
| 6,094,654 | * 7/2000 | Van Huben et al. | 707/8 |
| 6,101,533 | * 8/2000 | Brandt et al. | 709/213 |
| 6,151,684 | * 11/2000 | Alexander et al. | 714/4 |
| 6,233,702 | * 5/2001 | Horst et al. | 714/48 |

OTHER PUBLICATIONS

Bodorik, P et al., "Multi–view memory to support OS locking for transaction systems", Proceedings of the 1997 International Database Engineering and Applications Symposium, Ideas'97, Aug. 25–27, 1997, pp. 309–318.*

Hastings, Andrew "Distributed Lock Management in a Transaction Processing Environment", Proceedings of the 1990 Ninth Symposium on Reliable Distributed Systems, Oct. 9–12, 1990, pp. 22–31.*

(List continued on next page.)

Primary Examiner—Hosain T. Alam
Assistant Examiner—Shahid Alam
(74) Attorney, Agent, or Firm—Gerald R. Woods; Womble Carlyle Sandridge & Rice (57) ABSTRACT

A system and method for a multiple manager to multiple server Internet Protocol (IP) locking application in a directory-enabled network. The IP locking application is a component of a network management application and runs on each server device. The IP locking application processes requests from a network management application on two user-defined TCP/IP port numbers. The first port is designated as the status port and can be accessed by multiple network management applications and/or multiple users to determine the identification of the network management application and/or user that has control of the second port which is designated as the lock port. The status port is used to determine whether or not the server directory is currently being updated by another network management application or user. The lock port is used to actually lock the server device by forming a connection to the port and passing the user and network management application identifiers of the lock requester. Since the lock port is a TCP/IP port, only one connection can be active at a given time. The lock is normally released by disconnecting from the port.

56 Claims, 7 Drawing Sheets

OTHER PUBLICATIONS

Kroculick, Joseph et al., "Defining Provably–Corrected Escalation Policies For Multilayer Network Restoration", 1999 Global Telecommunications Conference, Globecom '99, Dec. 5–9, 1999, pp. 560–564, vol. 1b.*

Centralized and Rapid Backup/Restore For Work LAN File Services/VM; IBM Technical Disclosure Bulletin, vol. 35, No. 3, Aug. 1992, pp. 286–289.

* cited by examiner

MULTIPLE MANAGER TO MULTIPLE SERVER IP LOCKING MECHANISM IN A DIRECTORY-ENABLED NETWORK

BACKGROUND OF THE INVENTION

The present invention relates in general to data processing systems, and more particularly, to a system and method for a Directory Enabled Network (DEN)-based multiple manager to multiple server Internet Protocol (IP) locking mechanism.

Information describing the various users, applications, files, printers and other resources accessible from a network is often collected into a special database, sometimes called a directory. As the number of different networks and applications has grown, the number of specialized directories of information has also grown, resulting in islands of information that cannot be shared and are difficult to maintain.

The Lightweight Directory Access Protocol (LDAP) is an open directory standard that has evolved to meet these needs. LDAP defines a standard method for accessing and updating information in a directory. LDAP is gaining wide acceptance as the directory access method of the Internet and is therefore becoming strategic within corporate intranets.

A directory is a specialized database, also called a data repository, that stores typed and ordered information about objects. Directories allow users or applications to find resources that have the characteristics needed for a particular task. A directory has characteristics that sets it apart from general purpose relational databases. One special characteristic of directories is that they are accessed (read or searched) much more often than they are updated (written). Because directories must be able to support high volumes of read requests, they are typically optimized for read access. Write access might be limited to system administrators or to the owner of each piece of information.

Another important difference between a directory and a general-purpose database is in the way information can be accessed. Most databases support a standardized, very powerful access method called Structured Query Language (SQL). SQL allows complex update and query functions at the cost of program size and application complexity. LDAP directories, on the other hand, use a simplified and optimized access protocol that can be used in relatively simple applications.

Directories are usually accessed using the client/server model of communication. An application that wants to read or write information in a directory does not access the directory directly. Instead, it has the function for application programming interface (API) that causes a message to be sent to another process. The second process accesses the information in the directory on the path of the requesting application. The results of the read or write operation are then returned to the requesting application. The request is performed by the directory client, and a process that looks up information in the directory is called the directory server. The format and content of the messages exchanged between client and server must adhere to an agreed upon protocol. LDAP defines a message protocol used by directory clients and directory servers. There is also an associated LDAP API for the C language and ways to access LDAP from within a Java application. The client is not dependent upon a particular implementation of the server, and the server can implement the directory however it chooses.

The directory itself can be centralized or distributed. If a directory is centralized, there is one directory server that provides access to the directory. If the directory is distributed, there is more than one server that provides access to the directory. When a directory is distributed, the information stored in the directory can be partitioned or replicated. When information is partitioned, each directory server stores a unique and non-overlapping subset of the information. That is, each directory entry is stored by one and only one server. When information is replicated, the same directory entry is stored by more than one server. In a distributed directory, some information may be partitioned, and some information may be replicated. The three "dimensions" of a directory: scope of information, location of clients, and distribution of servers are independent of each other.

LDAP was developed as a lightweight alternative to the directory access protocol (DAP) which is used by the Internet Engineering Task Force (IETF) X.500 standard created in 1988. LDAP requires the lighter weight and more popular TCP/IP protocol stack rather than the OSI protocol stack. LDAP defines a communication protocol. That is, it defines the transport and format messages used by a client to access data in an X.500-like directory. LDAP does not define the directory service itself.

A common directory infrastructure encourages new uses. The Directory Enabled Networks (DEN) Initiative is a proposal to allow information about network configuration, protocol information, router and switch characteristics, Virtual Private Networks (VPNs), etc., to be stored in an LDAP directory. The availability of this information in a common format for many equipment vendors allows the intelligent management and provisioning of network resources. Within the networking industry, DEN is currently viewed as a key piece to building intelligent networks, where products from multiple vendors can store and retrieve topology and configuration information from an LDAP server. Through DEN, these devices and services use LDAP to implement authentication and policy services, allowing guaranteed end-to-end quality of service (QOS) and other features.

LDAP defines the content of messages exchanged between an LDAP client and an LDAP server. The messages specify the operations requested by the client (search, modify, delete, etc.), the responses from the server, and the format of data carried in the messages. LDAP messages are carried over TCP/IP, a connection-oriented protocol; so that there are also operations to establish and disconnect a session between the client and server.

The general interaction between an LDAP client and an LDAP server takes the following form:
1. The client establishes a session with an LDAP server. This is known as binding to the server.
2. The client then performs operations on directory data. LDAP offers both read and update capabilities. This allows directory information to be managed as well as queried.
3. When the client is finished making requests, it closes the session with the server. This is also known as unbinding.

A directory entry usually describes an object such as a person, a printer, a server, etc. Each entry has a name called a distinguished name (DN) that uniquely identifies it. The DN consists of a sequence of parts called relative distinguished names (RDNs), much like a file name consists of a path of directory names in many operating systems such as UNIX and WINDOWS. The entries are arranged into a hierarchical tree-like structure based on their distinguished names. This tree of directory entries is called the Directory Information Tree (DIT).

Each entry contains one or more attributes that describe the entry. Each attribute has a type and a value. A directory entry describes an object. An object class is a general description, sometimes called a template, of an object as opposed to the description of a particular object. The object classes that a directory server can store and the attributes they contain are described by a schema. Schema define the object classes that are allowed, the attributes that they must contain, the attributes that are optional, and the syntax of each attribute. One or more schemas may be supported by the client and server.

Networking hardware and software vendors need to develop DEN applications in which multiple network management applications (LDAP clients) with multiple users are capable of updating the directory information contained in multiple LDAP servers. Since there is no mechanism to control this type of access, a variety of problems may arise when multiple users and/or managers attempt to update the information contained in multiple servers.

SUMMARY OF THE INVENTION

It is therefore an object of the present invention to provide a mechanism to control access to information stored in server directories in a directory-enabled network by a plurality of network management applications with multiple users attempting to update the information stored in server directories at multiple servers.

The foregoing objective is achieved by an Internet Protocol (IP) locking application which is a component of a network management application and runs on each server device. The IP locking application processes requests from a modified network management application on two user-defined Transmission Control Protocol/Internet Protocol (TCP/IP) port numbers. The first port is designated as the status port for the locking application and can be accessed by multiple network management applications and/or multiple users to determine the identification of the network management application and/or user that has control of the second port which is designated as the lock port. The status port is used by network management applications to determine whether or not the server directory is currently being updated by another network management application or user. The lock port is used by a network management application to actually lock the server device by forming a connection to the port and passing the user and network management application identifiers of the lock requester. Since the lock port is a TCP/IP port, only one connection can be active at a given time. In this case, it is a specific user at a specific network management application. The lock is normally released by disconnecting from the port. However, if for any reason the connection drops, such as a user logoff, a network management application being shut down, or a network management application reboot, the lock will be automatically released.

BRIEF DESCRIPTION OF THE DRAWINGS

The invention is better understood by reading the following detailed description of the preferred embodiment in conjunction with the accompanying drawings, wherein.

DETAILED DESCRIPTION OF THE PREFERRED EMBODIMENT

The LDAP functional model determines how a client accesses and updates information in an LDAP directory, as well as how directory data can be manipulated. LDAP offers nine basic functional operations: add, delete, modify, bind, unbind, search, compare, modify distinguished name and abandon. The add, delete and modify operations govern changes to directory entries. Bind and unbind operations enable and terminate the exchange of authentication information between LDAP clients and servers, granting or denying end-users access to specific directories. The search operation locates specific users or services in the directory tree. Compare allows client applications to test the accuracy of specific values or information using entries in the LDAP directory. Modify distinguished name makes it possible to change the name of an entry. The abandon operation allows a client application to tell the directory server to drop an operation in progress. The LDAP protocol defines how the basic functional operations map onto TCP/IP. The protocol specifies the interaction between clients and servers and determines how LDAP requests and responses are formed, i.e., how the bits look on the wire.

Each LDAP update operation is atomic which means that the whole operation is processed as a single unit of work. This unit of work either completely succeeds or else no modifications to the LDAP directory are performed. For example, a modify request that affects multiple attributes within an entry cannot partly succeed, with certain attributes being updated and others not being updated. If the client receives a successful result from the server, then all of the modifications were applied. If the server returns an error to the client, then none of the modifications were applied.

Figure 1:
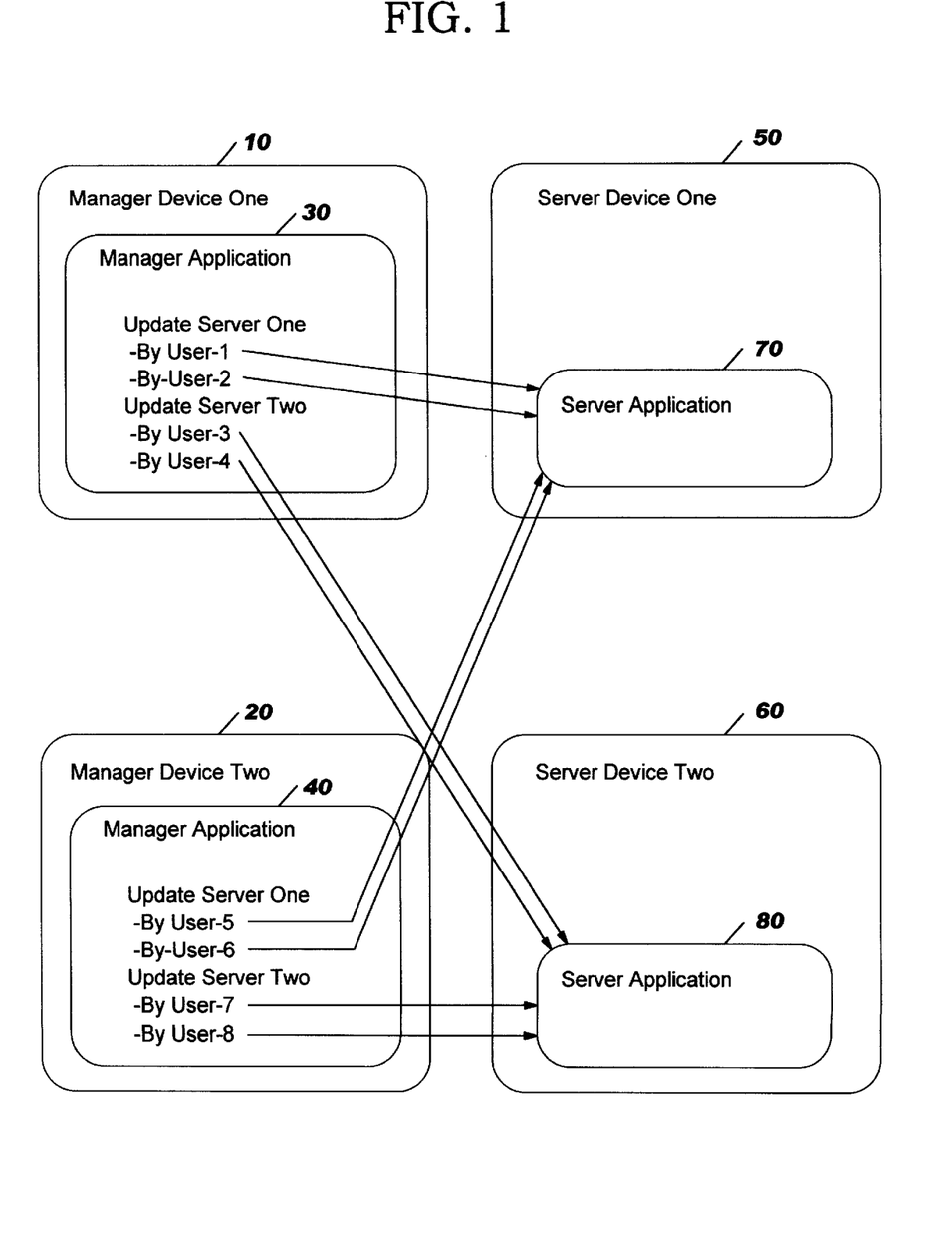
FIG. 1 illustrates the potential interactions between multiple users, multiple network management applications and multiple servers in a directory-enabled network.

FIG. 1 illustrates the potential interactions between multiple users, multiple network managing applications, and multiple servers. Depicted in this figure are manager device one 10 with manager application 30 resident on it, manager device two 20 with manager application 40 resident on it, server device one 50 with server application 70 resident on it, and server device two 60 with server application 80 resident on it. In the scenario shown in FIG. 1, user-1 and user-2 at manager application 30 both attempt to update server application 70 simultaneously. Likewise, user-3 and user-4 at manager application 30 are simultaneously attempting to update server application 80. At manager application 40, user-5 and user-6 are both attempting to update server application 70 simultaneously, and user-7 and user-8 are both attempting to update server application 80 simultaneously.

In an effort to address the problem of multiple users and/or multiple managers attempting to update information contained in multiple servers simultaneously, the IP locking application mechanism of the present invention was developed. The IP locking application is written in the Java programming language and is a component of the management application that is launched (i.e., runs) on the server device. The IP locking application processes requests on two user-defined TCP/IP port numbers. The first port is designated as the "status port" and the second port is designated as the "lock port". The status port is used by network management applications to determine whether or not the server is currently being updated by another user or host. A number of users should be able to access the status port concurrently. The lock port is actually used by network management applications to lock the server application by forming a connection to the port and passing the user and/or host identification of the lock requester. Since the lock port is a TCP/IP port, only one connection can be active at a given time. In this case, a specific user at a specific manager application is active. The IP lock is normally released by disconnecting from the port. However, if for some reason the connection drops, the lock will be automatically released. The connection drops can be caused by user log-offs, manager applications going away, manager device rebooting, etc.

Figure 2:
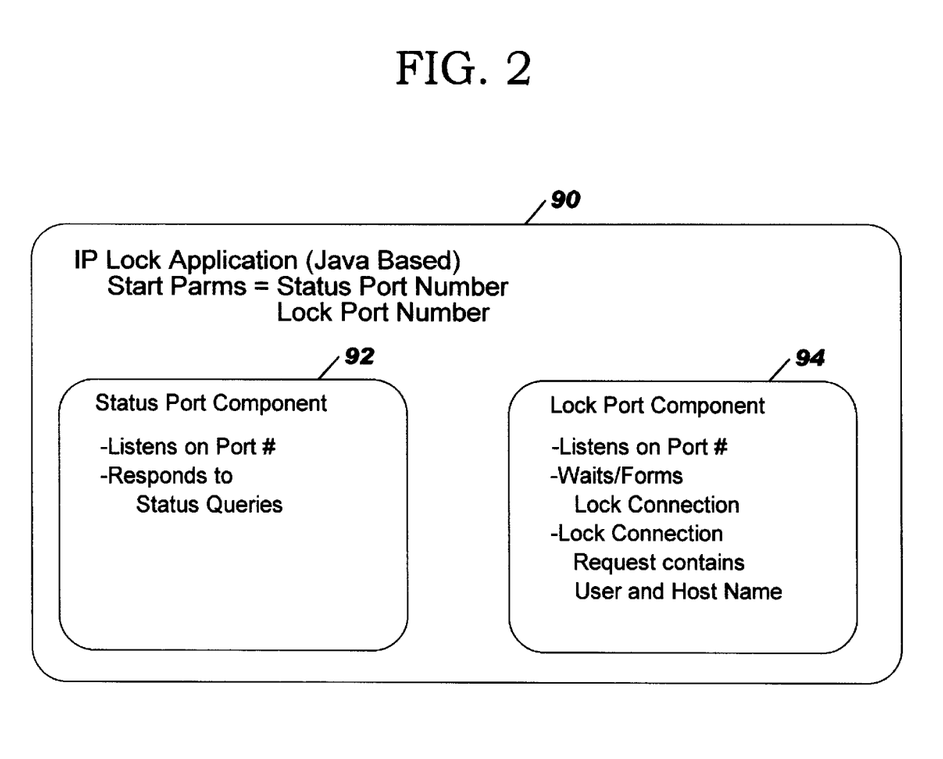
FIG. 2 illustrates a Java-based Internet Protocol (IP) locking mechanism of the present invention.

Since the IP locking application is written in the Java language, it is server platform independent. Essentially this means that once the locking application is written once, it can be run everywhere. However, it should also be noted that the IP locking application can be written in another language. FIG. 2 illustrates the components of a Java based IP locking application. As illustrated, IP locking application 90 has a status port component 92 and a locking port component 94. The start parameters for the IP locking application are the status port number and the lock port number. The status port component 92 listens on the status port and responds to status queries. Lock port component 94 listens on the lock port, waits for a request and forms a lock connection, the lock connection requests containing the user's and the host's identifier.

Figure 3:
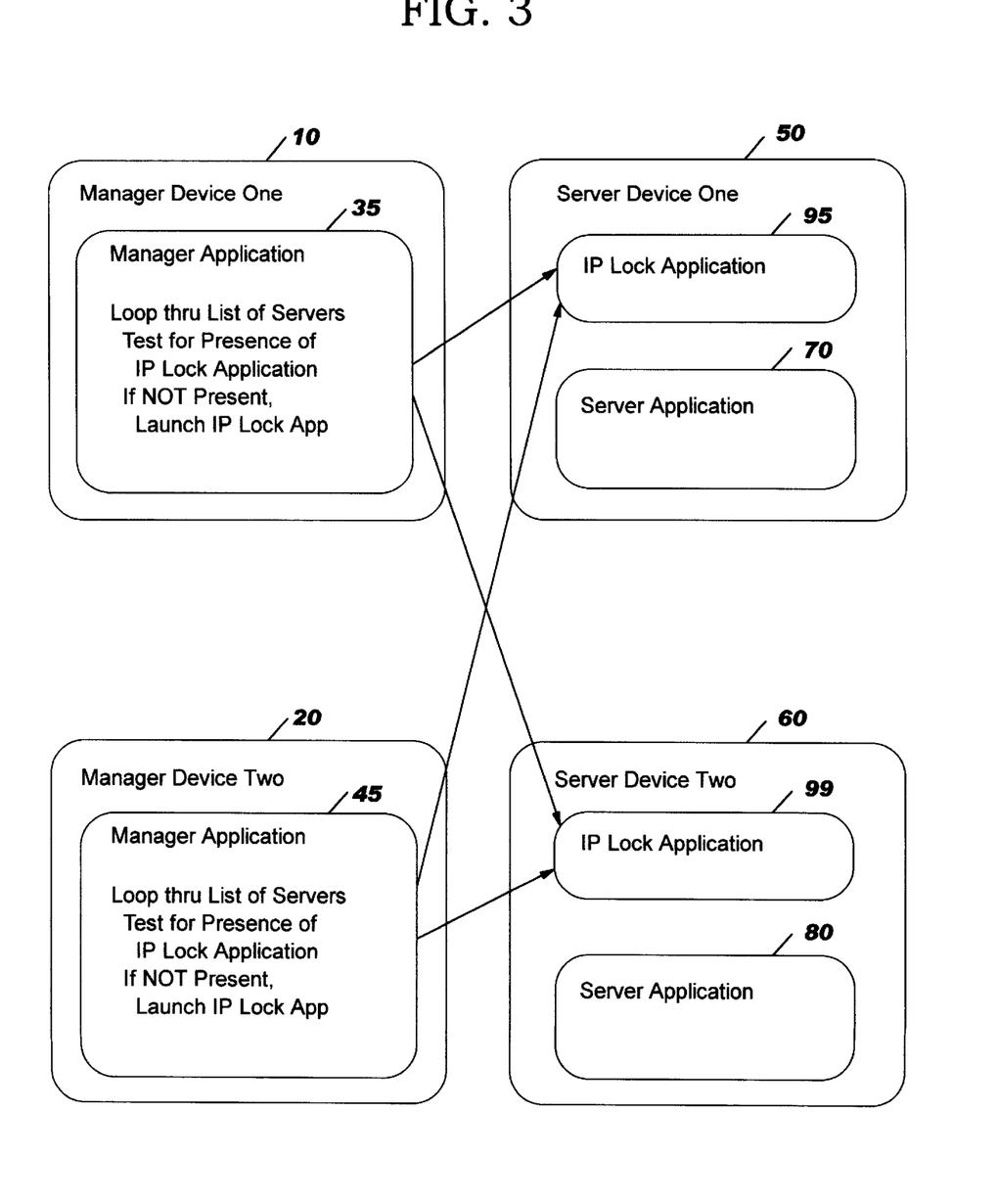
FIG. 3 illustrates the launching of an IP locking application on multiple servers by multiple network management applications in a preferred embodiment of the present invention.

FIG. 3 illustrates the launching of an IP locking application 95, 99 on multiple servers 50, 60 by multiple network management applications 35, 45, respectively. Manager device one 10 has modified manager application 35 resident on it. Manager device two 20 has modified manager application 45 resident on it. Server device one 50 has server application 70 and IP lock application 95 resident on it. Server device two 60 has server application 80 and IP lock application 99 resident on it. Both manager applications 35, 45 will loop through the list of servers and test for the presence of an IP lock application. If the manager application 35, 45 does not find an IP lock application present, it will launch an IP lock application on the corresponding server device.

Figure 4:
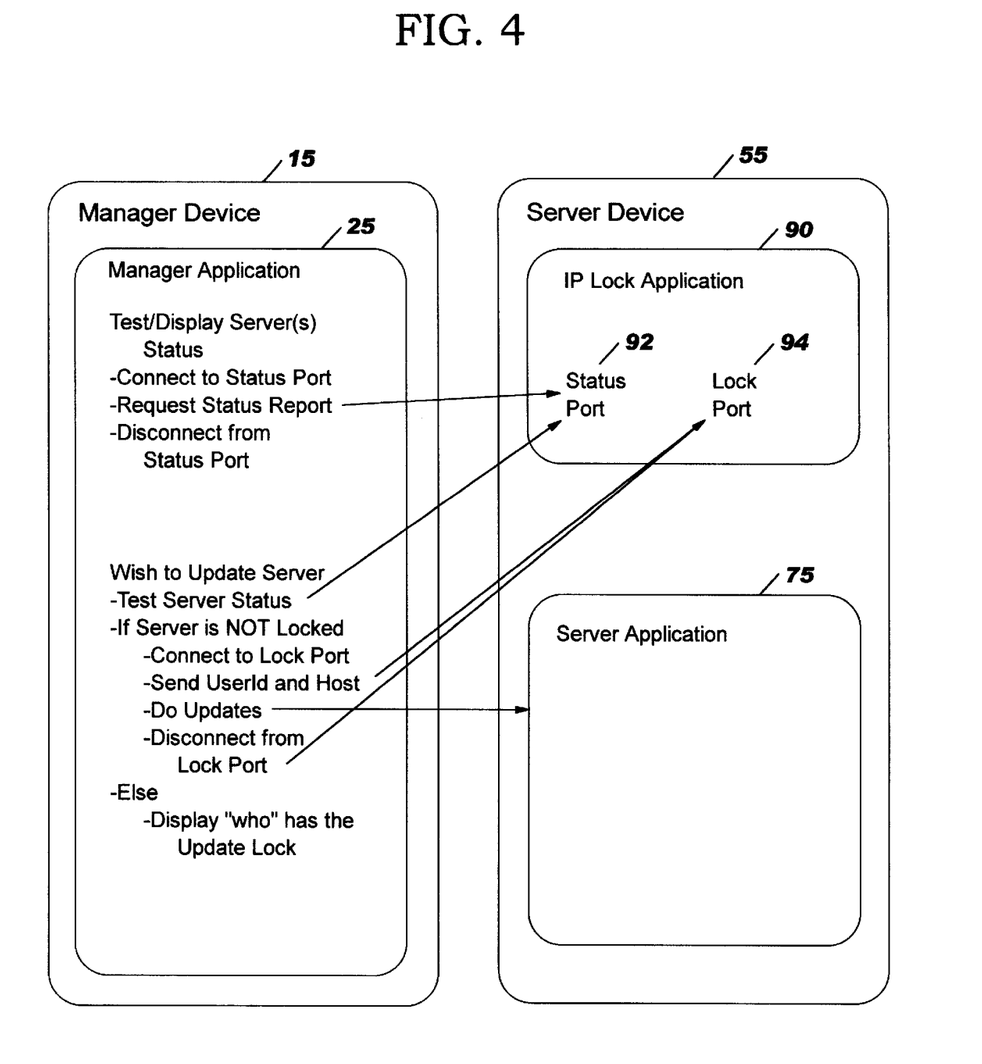
FIG. 4 illustrates the interactions between a specific network management application and a specific server in the preferred embodiment of the present invention.

Once the IP locking application is in place, multiple management applications with multiple users are free to display status and request the lock from multiple servers. FIG. 4 illustrates the interactions between a specific management application 25 resident on manager device 15 and a specific server device 55. In this instance, server device 55 has server application 75 and IP locking application 90 resident on it. IP locking application 90 has status port component 92 and lock port component 94. Manager application 25 can test or display server(s) status by connecting to a status port 92, requesting a status report, and then disconnecting from the status port 92. If manager application 25 wants to update server application 75, it first tests for server application 75 status. If the server application 75 is not locked, the manager application will connect to the lock port 94, send its user identifier and host identifier, perform updates on the server application 75, and then disconnect from the lock port 94. If manager application 25 finds a server application 75 locked, it requests a display of which application or device has the update TCP/IP port locked.

Figure 5A:
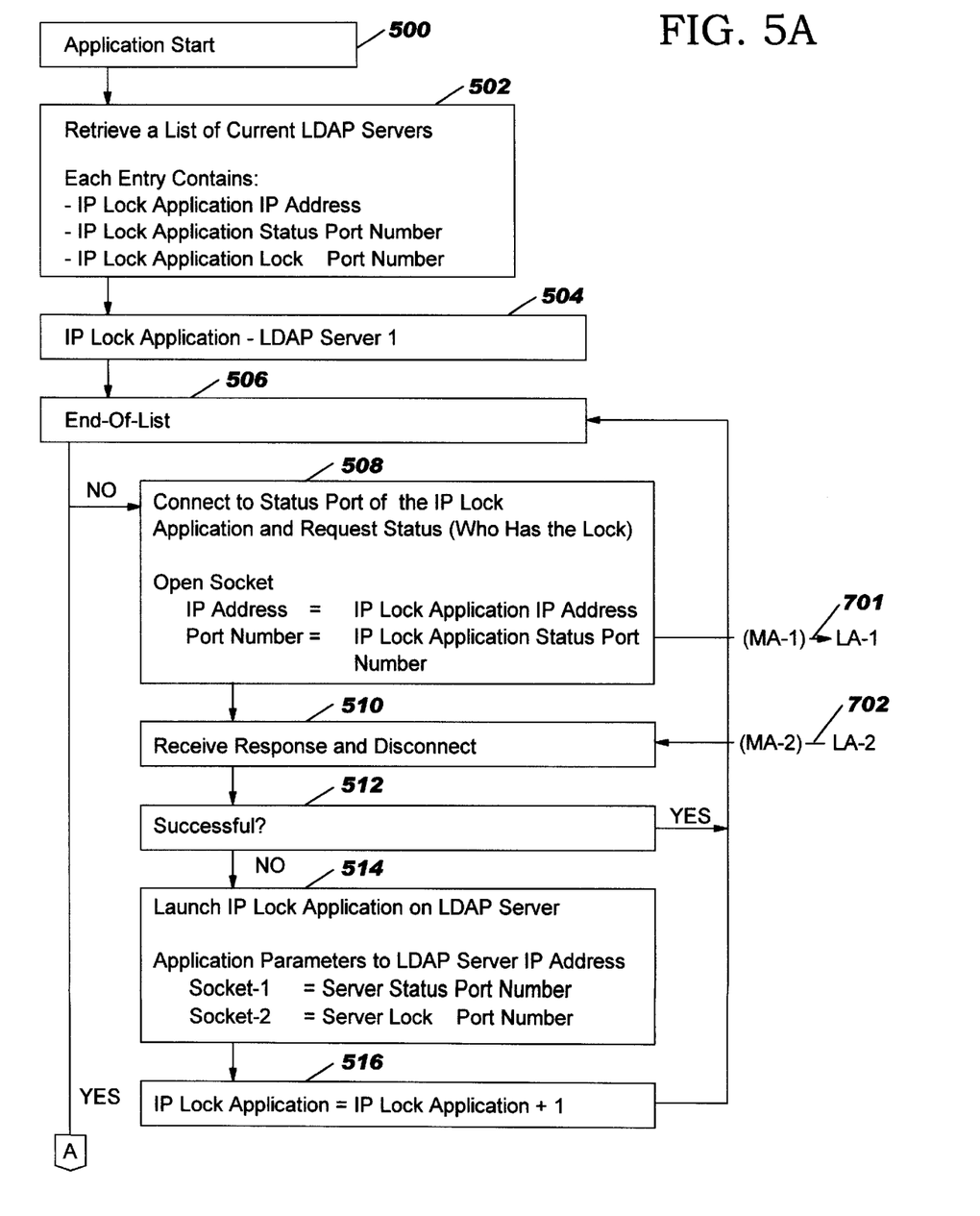
FIGS. 5A–5B illustrate the processing logic performed by a network manager application in retrieving a list of current LDAP servers and launching an IP locking application on an LDAP server in the preferred embodiment of the present invention.
Figure 5B:
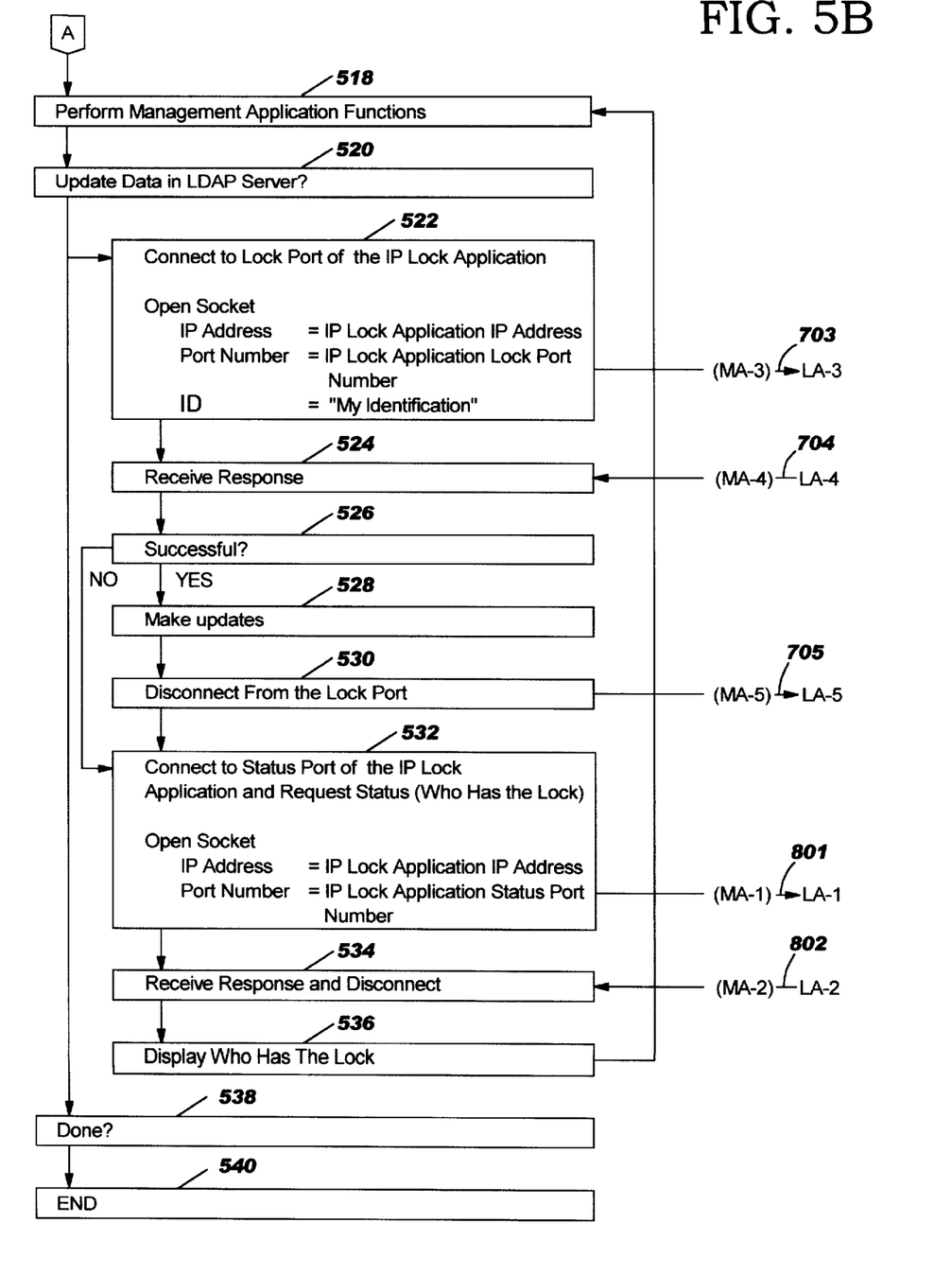

FIGS. 5A–5B depict the processing logic performed by the manager application 25 of the present invention. The start of the processing is indicated by logic block 500. In logic block 502, manager application 25 retrieves a list of current LDAP servers. Each entry in the list contains an IP locking application IP address, an IP locking application status port number, and an IP locking application lock port number. In logic block 504, an IP locking application index is set equal to LDAP server one. Next, in decision block 506, a test is made to determine if the end of the LDAP server list has been reached. If the end of the list has been reached, the manager application 25 processing continues in logic block 518 with the performance of management application functions. Otherwise, in logic block 508, the manager application 25 connects to the status port of the IP locking application and requests its status, i.e., determines which manager application has the IP lock. Also in logic block 508, a socket is opened with an IP address set to the IP locking application TCP/IP address and the port number set to the IP locking application status port number. The information described in logic block 508 is passed by the manager application 25 to the IP locking application 90 via message flow 701. The locking application 90 responds with identification of the manager application that is connected to the lock port 94 in message flow 702 which is received as indicated by logic block 510 in which the manager application 25 receives the response and disconnects from the status port 92. Next, in decision block 512, a test is made to determine if the result of the status test is successful, i.e., another user or manager application is connected to the lock port. If it is, the processing returns to logic block 506 to determine if the end of the LDAP server list has been reached. If the result in decision block 512 is determined not to be successful, processing continues in logic block 514 in which the manager application 25 launches the IP locking application on the specific LDAP server 55. Application parameters that are sent to the LDAP server IP address are socket one set to the server status port number and socket two set to the server lock port number. In logic block 516, the IP locking application index is incremented by one (i.e., LDAP server 2) and processing returns to decision block 506 to determine if the end of LDAP server list has been reached.

From decision block 506, processing either continues with logic block 508 as described above or with logic block 518 in which the management application 25 performs management application functions. Processing then continues in decision block 520 in which the management application 25 determines whether or not it needs to update data in the LDAP server application 75. If the result of the test in decision block 520 indicates that the relevant data does not need to be updated in the LDAP server application 75, processing continues in decision block 538 in which the manager application 25 determines whether it has completed performing management application functions. If it has, processing ends in logic block 540. If in decision block 520 it is determined that the manager application 25 needs to update an LDAP server application 75, the manager application 25 performs the processing indicated in logic block 522. As shown, the manager application 25 will attempt to connect to the lock port of the IP locking application by opening a socket with an IP address equal to the IP lock application IP address and the port number equal to the IP lock application locking port number and with an identifier set to the identification of the manager application 25. This information is passed from manager application 25 to the LDAP server 55 as indicated by message flow 703. Next, the manager application 25 receives a response from the LDAP server 55 as indicated by logic block 524 and by message flow 704. In decision block 526, a determination is made whether or not the attempt to connect to the lock port 94 of the IP locking application 90 was successful. If it was, then processing continues in logic block 528 in which the manager application 25 makes updates to the LDAP server directory 75. After completing the updates, processing continues in logic block 530 in which the manager application 25 disconnects from the lock port 94 via message flow 705. If in decision block 526, the attempt to connect to the lock port 94 for the IP locking application 90 was unsuccessful, processing continues in logic block 532 in which the manager application 25 again connects to the status port 92 of the IP locking application 90 and requests the status of the IP lock. As before, the manager application 25 opens a socket with an IP address set to the IP locking application TCP/IP address and the port number set to the IP locking application status port number. This is reflected in message flow 801 which contains the identical information as that in message flow 701. The manager application 25 receives a response from the LDAP server 55 as indicated by message flow 702 and logic block 534. Note that message flow 802 is identical to that of message flow 702. This is followed by logic block 536 in which the manager application 25 displays another management application that currently has the lock port. From logic block 536 processing returns to logic block 518 where the management application 25 again performs management functions.

Figure 6:
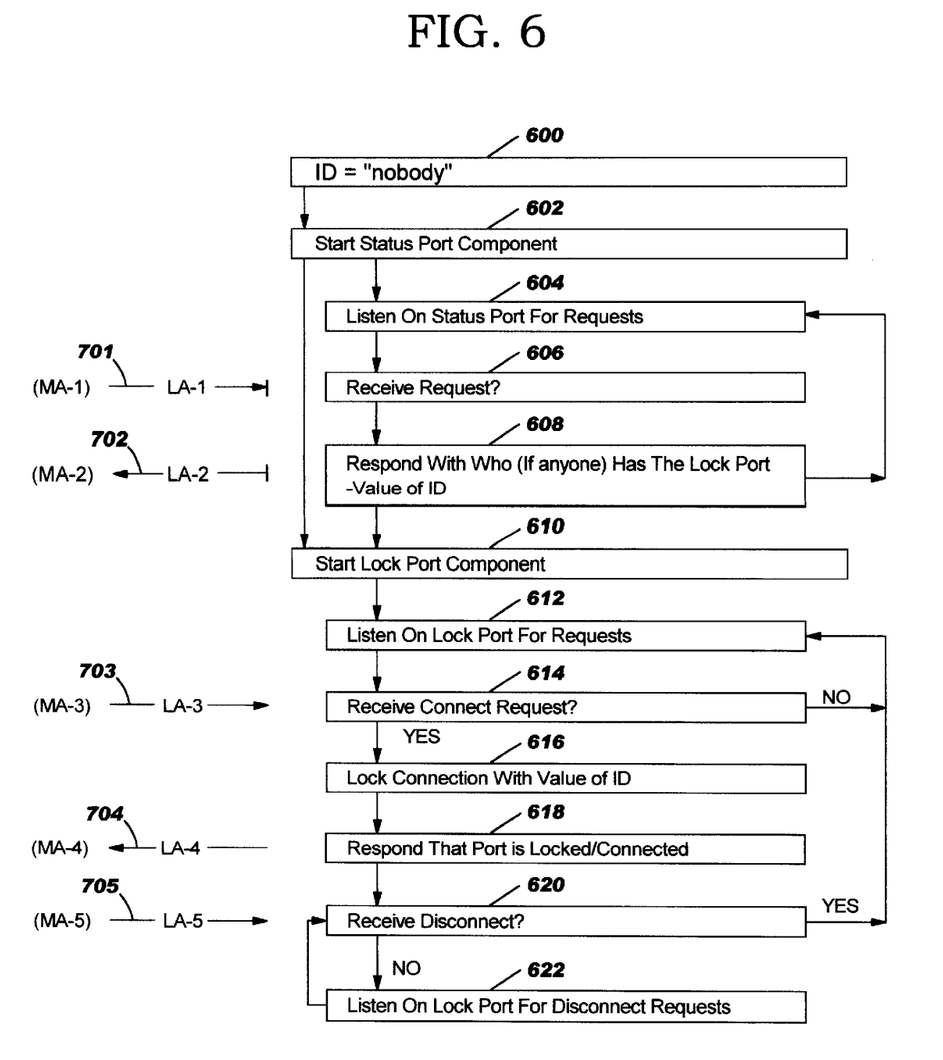
FIG. 6 illustrates the processing logic performed by an IP locking application on an LDAP server in the preferred embodiment of the present invention.

The processing logic performed by the locking application 90 at an LDAP server 55 is illustrated in FIG. 6. In logic block 600, the identification of the manager application that currently has control of the lock port is set equal to "nobody". The status port component 92 of the IP locking application 90 at the LDAP server 55 is started in logic block 602 which in turn causes the lock port component 94 of the IP locking application 90 to start in logic block 610. Following logic block 602, processing continues in logic block 604 in which the status port component listens on the status port for requests from manager applications. If a request is received as indicated in logic block 606, the status port component 92 responds with identification of the manager application that is connected to the lock port. The receipt of a request to identify who has the lock port is indicated by message flow 701. The response of the LDAP server 55 to the manager application 25 is indicated by message flow 702.

When the lock port component 94 of the IP locking application is started in logic block 610, processing continues in logic block 612 in which the IP lock port component 94 listens on the lock port for requests from manager applications. If a connection request is received as indicated by message flow 703 and decision block 614, then in logic block 616 the lock port component 94 locks the connection with the value of the identifier of the management application. Next, in logic block 618 the lock port component 94 responds to the connection request that the port is locked and/or connected. This is reflected in message flow 704 from the locking application 90 to the manager application 25. In decision block 620, the locking application 90 determines if it has received a disconnect message from the manager application 25 as indicated by message flow 705. If it has, then processing returns to logic block 612 in which lock port component 94 listens on the lock port for additional requests from manager applications. Otherwise, processing continues in logic block 622 in which the IP locking application 90 listens on the lock port for disconnect requests. Processing returns to decision block 620 when a disconnect message is received from the manager application currently having control of the lock port.

The multiple manager to multiple server IP locking mechanism in a directory-enabled network of the present invention has been described as a computer program that can be resident on one or more host computers such as a network device, a network management platform, or a server. As such, the IP locking mechanism can be stored as an application on any network device. It is important to note, however, that those skilled in the art will appreciate the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as diskettes or CD ROMS and transmission type media such as analog of digital communication links.

Additionally, the corresponding structures, materials, acts, and equivalents of all means plus function elements in the claims below are intended to include any structure, material, or acts for performing the functions in combination with other claimed elements as specifically claimed.

While the invention has been particularly shown and described with reference to a preferred embodiment thereof, it will be understood by those skilled in the art that various changes in form and detail may be made without departing from the spirit and scope of the present invention.

What is claimed is:

1. A method for updating information stored in a server directory in a client-server computer system comprising at least one server device and a plurality of client devices connected by a computer network, including at least one network management device having a plurality of users, the method comprising the steps of:
   retrieving a current list of the at least one server device at the at least one network management device;
   connecting a first user to a status port of an Internet Protocol (IP) locking application at the at least one server device;
   requesting from the locking application, an identification of a second user that has control of a lock port of the locking application at the at least one server device;
   connecting the first user to the lock port of the locking application;
   updating information stored in the server directory at the at least one server device; and
   disconnecting the first user from the lock port of the locking application after the update is complete.

2. The method for updating information of claim 1 wherein the step for retrieving a current list of the at least one server device includes the step of retrieving an entry for the locking application for each server device containing an IP address, a status port number and a lock port number.

3. The method for updating information of claim 1 wherein the step for connecting a first user to a status port includes opening a Transmission Control Protocol/Internet Protocol (TCP/IP) socket with an IP address set to the IP address of the locking application and a port number set to the status port number of the locking application.

4. The method for updating information of claim 1 further comprising the step of:
   if the request for the identification of the second user that has control of the lock port is unsuccessful, launching the IP locking application on the at least one server device.

5. The method for updating information of claim 4 further comprising the step of passing locking application parameters to the IP address of the at least one sever device, the parameters including a first TCP/IP socket set to the status port number and a second TCP/IP socket set to the lock port number of the locking application.

6. The method for updating information of claim 1 wherein the step for connecting the first user to the lock port includes opening a TCP/IP socket with an IP address set to the IP address of the locking application, a port number set to the lock port number of the locking application and an identifier set to an identifier for the first user.

7. The method for updating information of claim 1 further comprising the steps of:

if the step for connecting the first user to the lock port of the locking application is unsuccessful, connecting the first user to the status port of the locking application by opening a TCP/IP socket with an IP address set to the IP address of the locking application and a port number set to the status port number of the locking application; and requesting the identification of a second user that has control of the lock port of the locking application.

8. The method for updating information of claim 7 further including the steps of receiving the identification of the second user from the locking application and disconnecting the first user from the status port of the locking application.

9. The method for updating information of claim 8 further including the step of displaying at the at least one network management device, the identification of the second user that has control of the locking application.

10. The method for updating information of claim 1 wherein the at least one server device conforms to the Lightweight Directory Access Protocol (LDAP).

11. The method for updating information of claim 1 wherein the computer network is a directory-enabled network (DEN).

12. The method for updating information of claim 1 wherein the first user and the second user are active at the at least one network management device.

13. The method for updating information of claim 1 wherein the first user is active at a first network management device, and the second user is active at a second network management device.

14. A computer program product adaptable for storage on a program storage media at a host machine in a client-server computer system comprising at least one server device and a plurality of client devices connected by a computer network, and including at least one network management device having a plurality of users, the computer program product operable in conjunction with the at least one network management device for updating information stored in a server directory at the at least one server device, the computer program product comprising:

program code for retrieving a current list of the at least one server device stored at the at least one network management device;

program code for connecting a first user to a status port of an Internet Protocol (IP) locking application at the at least one server device;

program code for requesting from the locking application, an identification of a second user that has control of a lock port of the locking application at the at least one server device;

program code for connecting the first user to the lock port of the locking application;

program code for updating information stored in the server directory at the at least one server device; and program code for disconnecting the first user from the lock port of the locking application after the update is complete.

15. The computer program product of claim 14 wherein the program code for retrieving a current list of the at least one server device includes program code for retrieving an entry for the locking application for each server device containing an IP address, a status port number and a lock port number.

16. The computer program product of claim 14 wherein the program code for connecting a first user to a status port includes program code for opening a Transmission Control Protocol/Internet Protocol (TCP/IP) socket with an IP address set to the IP address of the locking application number and a port number set to the status port number of the locking application.

17. The computer program product of claim 14 further comprising:

program code for launching the IP locking application on the at least one server device, if the program code for requesting the identification of the second user that has control of the lock port does not return a successful result.

18. The computer program product of claim 17 further comprising program code for passing locking application parameters to the IP address of the at least one sever device, the parameters including a first TCP/IP socket set to the status port number and a second TCP/IP socket set to the lock port number of the locking application.

19. The computer program product of claim 14 wherein the program code for connecting the first user to the lock port includes program code for opening a TCP/IP socket with an IP address set to the IP address of the locking application, a port number set to the lock port number of the locking application and an identifier set to an identifier for the first user.

20. The computer program product of claim 14 further comprising:

program code for connecting the first user to the status port of the locking application by opening a TCP/IP socket with an IP address set to the IP address of the locking application and a port number set to the status port number of the locking application, if the step for connecting the first user to the lock port of the locking application is unsuccessful; and program code for requesting the identification of a second user that has control of the lock port of the locking application.

21. The computer program product of claim 20 further including program code for receiving the identification of the second user from the locking application and program code for disconnecting the first user from the status port of the locking application.

22. The computer program product of claim 21 further including program code for displaying at the at least one network management device, the identification of the second user that has control of the locking application.

23. The computer program product of claim 14 wherein the at least one server device conforms to the Lightweight Directory Access Protocol (LDAP).

24. The computer program product of claim 14 wherein the computer network is a directory-enabled network (DEN).

25. The computer program product of claim 14 wherein the first user and the second user are active at the at least one network management device.

26. The computer program product of claim 14 wherein the first user is active at a first network management device, and the second user is active at a second network management device.

27. A locking application computer program product adaptable for storage on a program storage media at a server device in a client-server computer system comprising at least one server device and a plurality of client devices connected by a computer network, and including at least one network management device having a plurality of users, the computer program product operable in conjunction with the at least one server device for updating information stored in a server directory at the at least one server device, the computer program product comprising:

a status port component program segment for receiving requests for status of a lock port in the locking application; and a lock port component program segment for receiving requests to connect to the lock port of the locking application.

28. The locking application computer program product of claim 27 wherein the status port component program code segment further comprises:

program code for listening on a status port for status requests from the plurality of users; and program code for responding to the status requests with the identification of the user that has control of the lock port.

29. The locking application computer program product of claim 27 wherein the lock port component program code segment further comprises:

program code for listening on the lock port for connection requests;

program code for locking a connection to one of said plurality of users that has made a connection request;

program code for responding to the one user that the lock port connection request has been accepted; and program code for receiving a disconnection request from the one user.

30. A system for updating information stored in a server directory in a client-server computer system comprising at least one server device and a plurality of client devices connected by a computer network, including at least one network management device having a plurality of users, the system comprising:

means for retrieving a current list of the at least one server device at the at least one network management device;

means for connecting a first user to a status port of an Internet Protocol (IP) locking application at the at least one server device;

means for requesting from the locking application, an identification of a second user that has control of a lock port of the locking application at the at least one server device;

means for connecting the first user to the lock port of the locking application;

means for updating information stored in the server directory at the at least one server device; and means for disconnecting the first user from the lock port of the locking application after the update is complete.

31. The system for updating information of claim 30 wherein the means for retrieving a current list of the at least one server device includes means for retrieving an entry for the locking application for each server device containing an IP address, a status port number and a lock port number.

32. The system for updating information of claim 1 wherein the means for connecting a first user to a status port includes means for opening a Transmission Control Protocol/Internet Protocol (TCP/IP) socket with an IP address set to the IP address of the locking application and a port number set to the status port number of the locking application.

33. The system for updating information of claim 30 further comprising:

means for launching the IP locking application on the at least one server device, if the request for the identification of the second user that has control of the lock port is unsuccessful.

34. The system for updating information of claim 33 further comprising means for passing locking application parameters to the IP address of the at least one sever device, the parameters including a first TCP/IP socket set to the status port number and a second TCP/IP socket set to the lock port number of the locking application.

35. The system for updating information of claim 30 wherein the means for connecting the first user to the lock port includes means for opening a TCP/IP socket with an IP address set to the IP address of the locking application, a port number set to the lock port number of the locking application and an identifier set to an identifier for the first user.

36. The system for updating information of claim 30 further comprising:

means for connecting the first user to the status port of the locking application by opening a TCP/IP socket with an IP address set to the IP address of the locking application and a port number set to the status port of the locking application, if the means for connecting the first user to the lock port of the locking application returns a result that the connection request was unsuccessful.

37. The system for updating information of claim 36 further including means for receiving the identification of the second user from the locking application and means for disconnecting the first user from the status port of the locking application.

38. The system for updating information of claim 37 further including a display device for displaying at the at least one network management device, the identification of the second user that has control of the locking application.

39. The system for updating information of claim 30 wherein the at least one server device conforms to the Lightweight Directory Access Protocol (LDAP).

40. The system for updating information of claim 30 wherein the computer network is a directory-enabled network (DEN).

41. The system for updating information of claim 30 wherein the first user and the second user are active at the at least one network management device.

42. The system for updating information of claim 30 wherein the first user is active at a first network management device, and the second user is active at a second network management device.

43. A method for updating information stored in a server directory in a client-server computer system comprising a plurality of server devices and a plurality of client devices connected by a computer network, including a plurality of network management device each having at least one user, the method comprising the steps of:

retrieving a current list of the plurality of server devices at each network management device;

connecting a first user to a status port of an Internet Protocol (IP) locking application at a first server device;

requesting from the locking application, an identification of a second user that has control of a lock port of the locking application at the first server device;

connecting the first user to the lock port of the locking application;

updating information stored in the server directory at the first server device; and disconnecting the first user from the lock port of the locking application after the update is complete.

44. The method for updating information of claim 43 wherein the step for retrieving a current list of the plurality of server devices at each network management device includes the step of retrieving an entry for the locking application for each server device containing an IP address, a status port number and a lock port number.

45. The method for updating information of claim 43 wherein the step for connecting a first user to a status port of a first server device includes opening a Transmission Control Protocol/Internet Protocol (TCP/IP) socket with an IP address set to the IP address of the locking application and a port number set to the status port number of the locking application.

46. The method for updating information of claim 43 further comprising the step of:

if the request for the identification of the second user that has control of the lock port at the first server device is unsuccessful, launching the IP locking application on the first server device.

47. The method for updating information of claim 46 further comprising the step of passing locking application parameters to the IP address of the first sever device, the parameters including a first TCP/IP socket set to the status port number and a second TCP/IP socket set to the lock port number of the locking application.

48. The method for updating information of claim 43 wherein the step for connecting the first user to the lock port of the first server device includes opening a TCP/IP socket with an IP address set to the IP address of the locking application, a port number set to the lock port number of the locking application and an identifier set to an identifier for the first user.

49. The method for updating information of claim 43 further comprising the steps of:

if the step for connecting the first user to the lock port of the locking application at the first server device is unsuccessful, connecting the first user to the status port of the locking application by opening a TCP/IP socket with an IP address set to the IP address of the locking application and a port number set to the status port number of the locking application; and requesting the identification of a second user that has control of the lock port of the locking application at the first server device.

50. The method for updating information of claim 49 further including the steps of receiving the identification of the second user from the locking application and disconnecting the first user from the status port of the locking application at the first server device.

51. The method for updating information of claim 50 further including the step of displaying at the requesting network management device, the identification of the second user that has control of the locking application at the first server device.

52. The method for updating information of claim 43 wherein each of the plurality of server devices conforms to the Lightweight Directory Access Protocol (LDAP).

53. The method for updating information of claim 43 wherein the computer network is a directory-enabled network (DEN).

54. The method for updating information of claim 43 wherein the first user and the second user are active at the same network management device.

55. The method for updating information of claim 43 wherein the first user is active at a first network management device, and the second user is active at a second network management device.

56. The method for updating information of claim 43 wherein the first user is automatically disconnected from the lock port of the locking application upon the occurrence of any event from among a logoff by the first user, a shut down of the network management application associated with the first user, and a reboot by the associated network management application, if the event occurs before the update of the information in the server directory is complete.

* * * * *